United States Patent
Shaffer et al.

(10) Patent No.: US 6,751,210 B1
(45) Date of Patent: Jun. 15, 2004

(54) ALTERNATE TELEPHONE CALL ROUTING SYSTEM

(75) Inventors: Shmuel Shaffer, Palo Alto, CA (US); William Joseph Beyda, Cupertino, CA (US)

(73) Assignee: Siemens Information & Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 08/942,592

(22) Filed: Oct. 2, 1997

(51) Int. Cl.[7] .............................................. H04L 12/66
(52) U.S. Cl. ....................................................... 370/352
(58) Field of Search ................................ 370/352, 353, 370/354, 355, 356, 357, 401, 410, 465; 379/219, 220, 221, 229, 220.01, 221.01, 224.02, 221.05; 709/239, 249, 250

(56) References Cited

U.S. PATENT DOCUMENTS

| | | | | |
|---|---|---|---|---|
| 5,654,957 A | * | 8/1997 | Koyama | 370/355 |
| 5,724,412 A | * | 3/1998 | Srinivasan | 379/93.23 |
| 5,828,666 A | * | 10/1998 | Focsaneanu et al. | 370/389 |
| 5,838,682 A | * | 11/1998 | Dekelbaum et al. | 370/401 |
| 5,848,143 A | * | 12/1998 | Andrews et al. | 379/219 |
| 5,889,774 A | * | 3/1999 | Mirashrafi et al. | 370/352 |
| 5,916,302 A | * | 6/1999 | Dunn et al. | 709/204 |
| 5,933,490 A | * | 8/1999 | White et al. | 379/221 |
| 5,970,126 A | * | 10/1999 | Bowater et al. | 379/114 |
| 6,011,794 A | * | 1/2000 | Mordowitz et al. | 370/389 |
| 6,064,653 A | * | 5/2000 | Farris | 370/237 |
| 6,574,216 B1 | * | 6/2003 | Farris et al. | 370/352 |
| 6,584,094 B2 | * | 6/2003 | Maroulis et al. | 370/352 |

* cited by examiner

Primary Examiner—Kwang Bin Yao

(57) ABSTRACT

A telecommunication system includes a source private branch exchange (12) that transmits telephone calls from a source to a destination private branch exchange (26) over a public switched telephone network (18). As an alternative to transmitting the calls over the public switched telephone network, the private branch exchange is coupled to a telephony Internet server 30 that can transmit telephone calls over a global wide area computer network such as the Internet (32). The private branch exchange (12) queries the destination private branch exchange (26) to determine if it similarly coupled to a telephony Internet server. If so, the bandwidth used by the telephony Internet server will allow the transmission of the telephone call, the call is routed over the Internet (32) to the intended recipient.

17 Claims, 2 Drawing Sheets

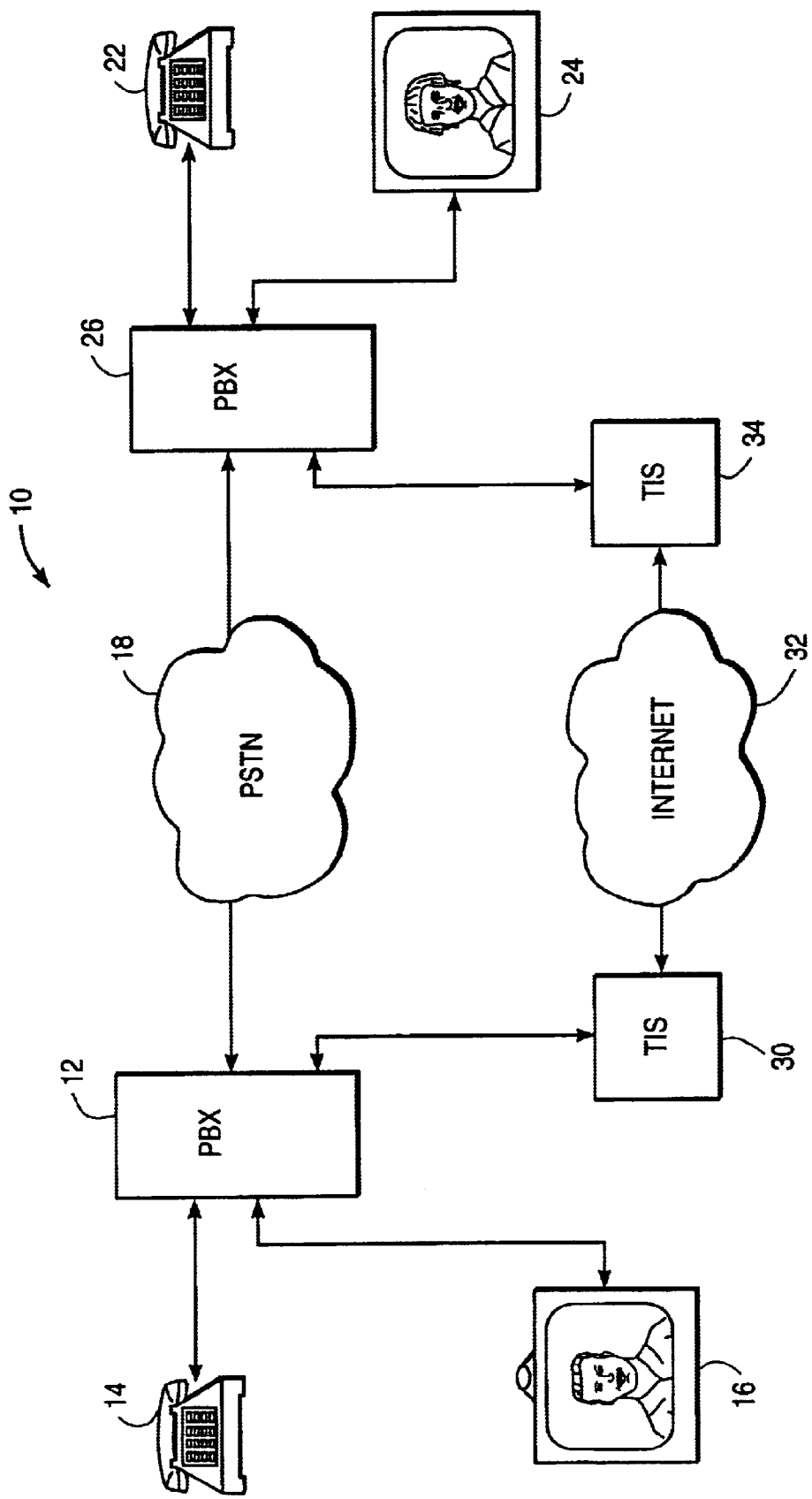
FIG_1

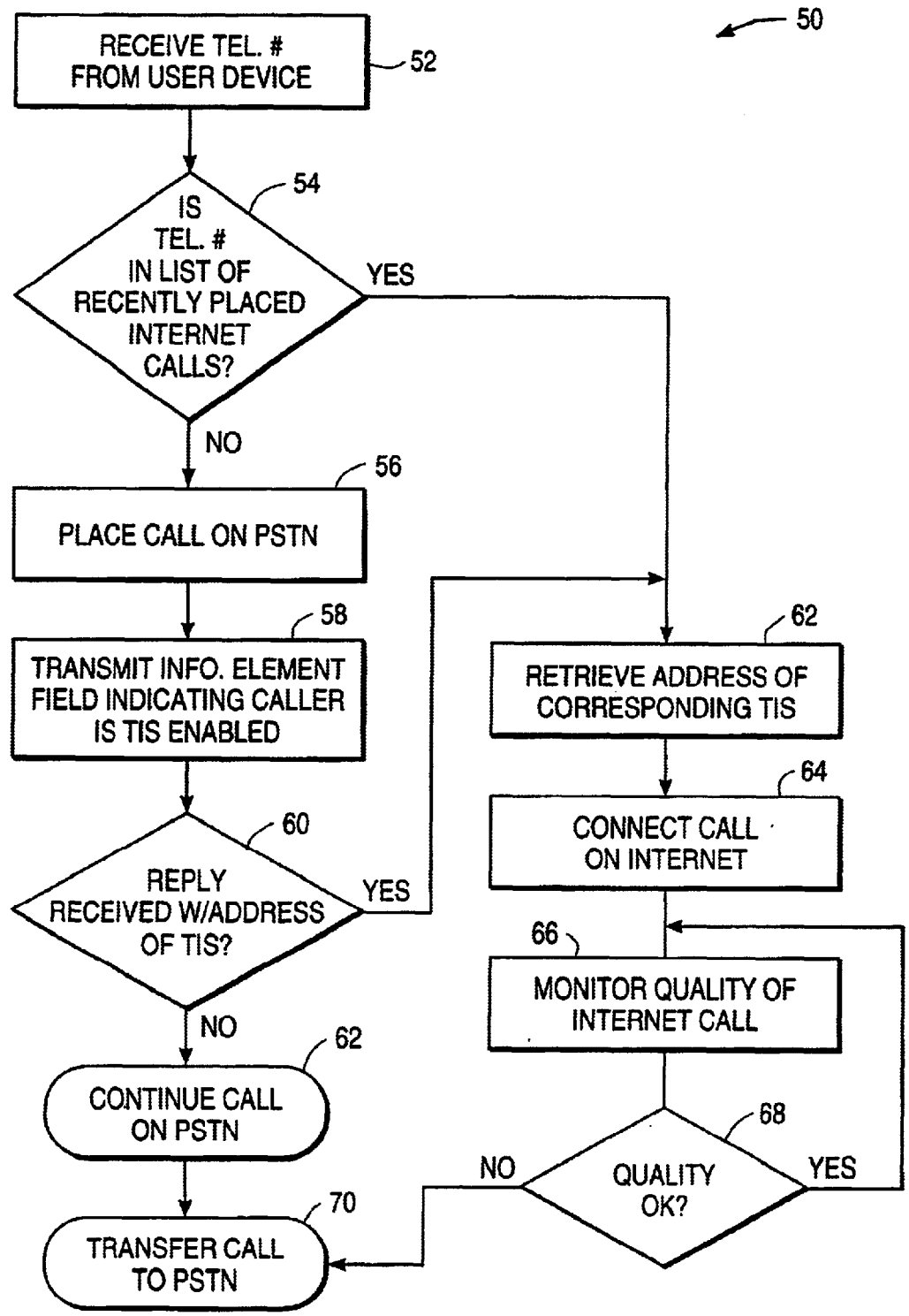

ALTERNATE TELEPHONE CALL ROUTING SYSTEM

FIELD OF THE INVENTION

The present invention relates to communication systems, and in particular to systems for selecting alternative routes for telephone calls.

BACKGROUND OF THE INVENTION

As business is conducted over ever expanding geographical areas, the use of telecommunication services to transmit voice and data signals is continually increasing. As a result of the increased use of these services, the cost for such services becomes a significant part of the cost of doing business. Therefore, most businesses are continually looking for ways to reduce their communication costs.

One known method of obtaining "free" telephone calls is to transmit the calls via a global wide area computer network such as the Internet. In effect, these calls are not free because the user leases the telephone lines that are used to provide their Internet access, however, calls placed over the Internet are not separately billed.

In the past, it has not been possible to seamlessly integrate the Internet as an alternative route for transmitting telephone calls because there is no way of knowing whether an intended recipient has the ability to receive such calls.

Given the shortcomings in the prior art, there is a need for a telephone communication system that can reduce communication costs by automatically determining when it is possible to transmit calls on the Internet to utilize excess bandwidth.

SUMMARY OF THE INVENTION

To reduce the cost associated with transmitting telephone calls over a public switched telephone network (PSTN), the present invention is a communication system that transmits calls from a source private branch exchange or central office to a destination private branch exchange or central office. The source private branch exchange is coupled to a telephony Internet server that can transmit a call over a global wide area computer network such as the Internet. To determine whether the call can be transmitted over the Internet, the source private branch exchange transmits a message to the destination private branch exchange over the PSTN to determine whether it is similarly equipped with a telephony Internet server. If so, and the bandwidth available on the Internet will accommodate an additional call, then the telephone call is routed to the Internet.

The quality of the call placed on the Internet is continually monitored. If the quality drops below a predetermined threshold, the call is rerouted from the Internet back to the public switched telephone network.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 1 is a block diagram of a communication system in accordance with the present invention; and FIG. 2 is a flow chart of the steps performed by the present invention to select the most appropriate path to route a telephone call.

DETAILED DESCRIPTION OF THE PREFERRED EMBODIMENT

The present invention is a communication system that can automatically determine whether to route a telephone call on a public switched telephone network or on an alternative path, such as the Internet, in order to reduce communication charges.

As shown in FIG. 1, the communication system 10, according to the present invention, includes a source private branch exchange (PBX) 12 that connects a telephone call between a number of user input devices and a public switched telephone network (PSTN) 18. The input devices may be standard telephones 14, a video conferencing system 16 or other types of communication systems such as facsimile machine, etc. Calls from a user input device are typically routed by the PBX 12 on the public switched telephone network 18 to an intended receiver. The intended receiver may be a conventional telephone 22 or a corresponding video conferencing system 24, facsimile machine, etc. The intended receivers are generally coupled to the public switched telephone network 18 through a destination private branch exchange PBX 26.

As described above, each time a user places a call on the public switched telephone network 18, they are charged for the use of the service. An alternative method of transmitting a telephone call is through the use of a global wide area computer network such as the Internet. To transmit these calls, a telephony Internet server 30 is coupled to the PBX 12. The telephony Internet server receives a digitized telephone signal, compresses the signal, and arranges the compressed signal into a series of data packets. An Internet address is added to each packet and the packets are transmitted over the Internet 32 to a receiving telephony Internet server 34, that is coupled to the receiving PBX 26. At the receiving telephony Internet server, the packets are decompressed, combined back into a serial data stream, and supplied to the PBX 26.

To reduce the cost of communication services, the communication system of the present invention determines when it is possible to route a telephone call on the Internet 32 rather than on the PSTN 18. In particular, if a desired recipient's PBX 26 is equipped with a telephony Internet server, and the bandwidth being used by such a server can handle the additional traffic, then a telephone call can be routed on the Internet to avoid paying the additional charges that would be incurred if the call were transmitted on the PSTN 18.

FIG. 2 is a flow chart of the steps 50 performed by the PBX 12 shown in FIG. 1 in order to determine whether a call should be routed on the PSTN 18 or on the Internet 32. Beginning with a step 52, the source PBX receives a telephone number of an intended recipient from a user input device such as a telephone, video conferencing system, facsimile machine, etc. At a step 54, the source PBX determines whether the telephone number received is in the list of recently placed Internet calls. If the answer to step 54 is no, then the PBX 12 begins to place the call on the PSTN 18 using an ISDN or other similar digital format.

As the call is being set up, the source PBX transmits an information element field that indicates the source PBX has a telephony Internet server with the ability to route the call over the Internet. This information element field is received by the destination PBX and decoded. The destination PBX then responds if it is similarly equipped with a telephony Internet server and if so includes with the response the Internet address of its telephony Internet server. At step 60, the sending PBX determines whether a reply has been received with an address of a destination telephony Internet server within a predetermined time limit. This time limit may be fixed or variable depending on who is attempting to place a call. For example, if the call is placed from an executive phone, then the time limit used before connecting a call on the PSTN may be shorter than the time limit used for calls that originate from the mailroom. If the answer to step 60 is no, then the call set up is completed on the PSTN at a step 62 in a conventional manner.

If the answer to either the step 54 or 60 is yes, then the PBX forwards the address of the destination telephony Internet server to the telephony Internet server that is coupled to the source PBX at a step 62. The telephony Internet server uses this address to send the packetized telephone call to the intended receiver on the Internet at a step 64. Calls may be immediately rerouted from a PSTN to the Internet upon the determination that the receiver is equipped with a telephony Internet server. If a response is received indicating that the call can be routed on the Internet after the call has already been set up on the PSTN, then the call can be switched to the Internet after a time period equal to the minimum billing increment on the PSTN. For example, if a call is initially set up on the PSTN and the PSTN bills in one minute increments, the call would be switched to the Internet at the end of the first minute.

At any time, the quality of the data transmission carried by the telephony Internet servers may degrade such that the call cannot be properly transmitted on the Internet. Therefore, at a step 66, the source PBX queries the telephony Internet server regarding the quality of the call placed on the Internet. Typically, quality is measured by the number of data packets that are transmitted in a given amount of time and the delay introduced by the telephony Internet servers and the network that extends between them to send the packets. Methods for establishing a level of quality on a packetized data network such as the Internet are considered well known to those of ordinary skill in the art and therefore need not be discussed in further detail.

At a step 68, the sending PBX determines whether the quality of the telephone connection is sufficient to continue the call. If so, processing returns to step 66 until either the quality degrades or the call is finished. If at step 68 it is determined that the quality is insufficient to carry the call, then the source PBX can reroute the telephone call to the intended recipient on the PSTN at a step 70 without user intervention.

As can be seen from the above description, the present invention is a communication system having alternative paths on which a call can be routed. By determining whether an intended recipient has the ability to transmit data on an alternative path such as the Internet, the alternative path can be used instead of a traditional PSTN. Telephone calls placed on alternative paths avoid the charges that are incurred each time a call is transmitted on the PSTN.

Although the present invention has been described with respect to the preferred embodiment, it will be appreciated by those skilled in the art that changes can be made. For example, it is possible that the telephony Internet servers could be located at a central telephone office for users that are not connected to the PSTN through a private branch exchange. The central office would query whether a central office that serves the intended recipient is connected with a telephony Internet server and, based on the answer, could route a telephone call either on the Internet or on the PSTN.

The embodiments of the invention in which an exclusive property or privilege is claimed are defined as follows:

1. A method of routing a telephone call over one of a public switched telephone network and a global wide area computer network, comprising:
   receiving a telephone number that is associated with an intended recipient of the telephone call;
   setting up a telephone call to the intended recipient on the public switched telephone network;
   before the telephone call is connected on the public switched telephone network, determining whether the recipient is equipped to receive the telephone call on the global wide area computer network based at least in part on a comparison of the telephone number with telephone numbers previously identified with recipients equipped to receive telephone calls on the global area computer network; and
   connecting the telephone call on the global wide area computer network if the recipient is equipped to receive the telephone call on the global wide area network.

2. The method of claim 1, wherein the telephone call is set up on an ISDN line over the public switched telephone network and wherein the step of determining whether the recipient is equipped to receive the telephone call on the global wide area computer network comprises:
   transmitting a signaling packet to the intended recipient that indicates that a source of the telephone call is equipped with a telephony Internet server; and
   receiving from the intended recipient a signaling packet that indicates whether the intended recipient is equipped with a telephony Internet server.

3. The method of claim 2, further comprising:
   monitoring a time period before a signaling packet is received from the intended recipient that indicates that the intended recipient is equipped with a telephony Internet server; and
   comparing the time period with a predetermined time threshold and if the time period exceeds the time threshold, then completing the telephone call set up on the public switched telephone network.

4. The method of claim 3, wherein the time threshold is varied depending on the source of the telephone call.

5. A method of routing a telephone call over one of a public switched telephone network and a global wide area computer network comprising:
   receiving a telephone number that is associated with an intended recipient of the telephone call:
   setting up a telephone call to the intended recipient on the public switched telephone network: and
   before the telephone call is connected on the public switched telephone network, determining if a signaling packet is received from the intended recipient that indicates the intended recipient is equipped with a telephony Internet server after the telephone call has been set up on the public switched telephone network, and if so, connecting the telephone call on the global wide area computer network at the end of a minimum billing increment of the public switched telephone network.

6. The method of claim 1, further comprising monitoring the quality of the telephone call on the global wide area computer network; and transferring the telephone call to the public switched telephone network if the quality is degraded.

7. The method of claim 6, wherein the telephone call is transmitted as a number of data packets on the global wide area network and wherein the step of monitoring the quality of the telephone call on the global wide area network, comprises:

determining the rate at which data packets are sent by and received by the telephony Internet servers; and determining if the rate of the data packets is less than a rate threshold and if so, declaring the quality of the telephone call to be degraded.

8. The method of claim 6, wherein the telephone call is transmitted as a number of data packets on the global wide area network and wherein the step of monitoring the quality of the telephone call on the global wide area network comprises:

determining-a delay time required before a data packet is transmitted on the global wide area network; and determining if the delay time is greater than a delay time threshold and if so declaring the quality of the telephone call to be degraded.

9. The method of claim 6, wherein the telephone call is transmitted as a number of data packets on the global wide area network and wherein the step of monitoring the quality of the telephone call on the global wide area network comprises:

determining a rate at which data packets are transmitted and received by the telephony Internet servers and a delay time required before a data packet is transmitted on the global wide area network;

comparing the rate and delay time to rate and delay time thresholds and if the rate is less than the rate threshold, or if the delay time is greater, than the delay threshold, declaring the quality of the telephone call to be degraded.

10. A communication system for routing a telephone call comprising:

a first private branch exchange (PBX) coupled to a first telephony Internet server; and a second PBX;

said first PBX setting up said call via said second PBX and determining whether said second PBX is coupled to a second telephony Internet server based at least in part on a comparison of the telephone number with telephone numbers previously identified with recipients equipped to receive telephone calls on the global area computer network;

if so, using the telephony Internet servers to route the call on the global wide area computer network; and if not, routing the telephone call on a public switched telephone network.

11. The system of claim 10, wherein the determining step comprises:

the first PBX transmitting to the second PBX a signaling packet indicating that the first PBX is coupled to the first telephony Internet server; and the second PBX transmitting to the first PBX a signaling packet that indicates that the second PBX is coupled to the second telephony Internet server.

12. The system of claim 11, wherein the determining step further comprises:

monitoring a time period before a signaling packet is received from the desired recipient that indicates that the desired recipient is equipped with a telephony Internet server; and comparing the time period with a predetermined time threshold and if the time period exceeds the time threshold, then completing the telephone call set up on the public switched telephone network.

13. The system of claim 12, wherein the time threshold is varied depending on the source of the telephone call.

14. The system of claim 10, wherein the quality of the call on the global wide area computer network is monitored and the call is transferred to the public switched telephone network if the quality is degraded.

15. The system of claim 14, wherein the call is transmitted as a number of data packets on the global wide area network and wherein the step of monitoring the quality of the telephone call on the global wide area network, comprises:

determining the rate at which data packets are sent by and received by the telephony Internet servers; and determining if the rate of the data packets is less than a rate threshold and if so, declaring the quality of the telephone call to be degraded.

16. The method of claim 14, wherein the call is transmitted as a number of data packets on the global wide area network and wherein the step of monitoring the quality of the call on the global wide area network comprises:

determining a delay time required before a data packet is transmitted on the global wide area network; and determining if the delay time is greater than a delay time threshold and if so declaring the quality of the telephone call to be degraded.

17. The method of claim 14, wherein the telephone call is transmitted as a number of data packets on the global wide area network and wherein the step of monitoring the quality of the telephone call on the global wide area network comprises:

determining a rate at which data packets are transmitted and received by the telephony Internet servers and a delay time required before a data packet is transmitted on the global wide area network;

comparing the rate and delay time to rate and delay time thresholds and if the rate is less than the rate threshold, or if the delay time is greater than the delay threshold, declaring the quality of the telephone call to be degraded.

* * * * *